(12) United States Patent
Mainini

(10) Patent No.: US 8,601,637 B2
(45) Date of Patent: ***Dec. 10, 2013

(54) ROBOTIC PET WASTE TREATMENT OR COLLECTION

(75) Inventor: Christopher E. Mainini, Knoxville, TN (US)

(73) Assignee: Radio Systems Corporation, Knoxville, TN (US)

( * ) Notice: Subject to any disclaimer, the term of this patent is extended or adjusted under 35 U.S.C. 154(b) by 24 days.

This patent is subject to a terminal disclaimer.

(21) Appl. No.: 13/163,184

(22) Filed: Jun. 17, 2011

(65) Prior Publication Data

US 2011/0247566 A1   Oct. 13, 2011

Related U.S. Application Data

(63) Continuation of application No. 11/625,977, filed on Jan. 23, 2007, now Pat. No. 7,984,529.

(51) Int. Cl.
*A47L 5/00* (2006.01)
*A47L 11/00* (2006.01)

(52) U.S. Cl.
USPC ............... 15/319; 15/320; 15/339; 15/340.3

(58) Field of Classification Search
USPC ................................. 15/319, 339, 320, 340.3
IPC .................................................. A47I 5/00,11/00
See application file for complete search history.

(56) References Cited

U.S. PATENT DOCUMENTS

| | | | |
|---|---|---|---|
| 5,684,695 A | 11/1997 | Bauer et al. | |
| 5,935,179 A | 8/1999 | Kleiner et al. | |
| 5,974,347 A | 10/1999 | Nelson et al. | |
| 6,339,735 B1 | 1/2002 | Peless et al. | |
| 6,493,613 B2 | 12/2002 | Peless et al. | |
| 6,615,108 B1 | 9/2003 | Peless et al. | |
| 6,671,592 B1 | 12/2003 | Bisset et al. | |
| 6,859,010 B2 | 2/2005 | Jeon et al. | |
| 6,885,912 B2 | 4/2005 | Peless et al. | |
| 6,925,679 B2 | 8/2005 | Wallach et al. | |
| 2002/0112899 A1 | 8/2002 | Dijksman et al. | |
| 2002/0133899 A1* | 9/2002 | Van den Berg | 15/319 |
| 2003/0120389 A1 | 6/2003 | Abramson et al. | |
| 2004/0049877 A1 | 3/2004 | Jones et al. | |
| 2004/0187249 A1 | 9/2004 | Jones et al. | |
| 2004/0220698 A1 | 11/2004 | Taylor et al. | |
| 2004/0244138 A1 | 12/2004 | Taylor et al. | |
| 2005/0166354 A1 | 8/2005 | Uehigashi | |

* cited by examiner

*Primary Examiner* — David Redding
(74) *Attorney, Agent, or Firm* — Pitts & Lake, P.C.

(57) ABSTRACT

A method and apparatus for the detection, treatment or collection of a quantity of solid animal excrement from a surface, particularly a grassy surface. The method includes the steps of autonomously or semi-autonomously detecting the presence of the excrement on the surface, moving a collection/treatment device into position over the detected excrement, and, thereupon, subjecting the detected excrement to one or more of deodorization, disinfection, enhancement of deterioration, dispersal and/or collection of the detected excrement. The apparatus of the present invention operates without the immediate or continued intervention of a human. Preferably, the device is robotic in nature, is readily portable, and preferably includes a rechargeable power source.

6 Claims, 4 Drawing Sheets

ROBOTIC PET WASTE TREATMENT OR COLLECTION

CROSS-REFERENCE TO RELATED APPLICATIONS

Not Applicable

STATEMENT REGARDING FEDERALLY SPONSORED RESEARCH OR DEVELOPMENT

Not Applicable

FIELD OF INVENTION

This invention relates to methods and devices for treatment and/or collection of solid excrement deposited by a pet or other animal on a surface, and particularly to the use of a robotic device for detecting and carrying out the treatment and/or collection functions.

BACKGROUND OF INVENTION

A major concern of the owner of a pet or other animal, as well as the public in general, is the disposition of solid or semi-solid excrement of pets. This concern extends to lawns, public parks and other grassy areas and to the structures where the animal is housed on a permanent or semi-permanent basis, such as kennels, barns, stalls and the like.

Removal of a pet's waste is a primary concern for many pet owners. It can be linked to unsanitary conditions, damage to landscaping and unsightly conditions. Known practical solutions for removal of such waste require a human to search for, identify, and remove the waste if the owner does not want the waste to remain on the premises. Excrement disposition associated with housing structures for dogs and horses, and/or other animals require routine cleaning and/or other treatment on a regular basis to avoid matters such as offensive odors and/or the spread of infectious diseases.

"Walking" of pets, in particular, for purposes of permitting the animal to relieve their kidneys or bowels is commonplace and can be the source of serious objections by neighbors or members of the public. Prohibition of the "walking" of an animal except within designated areas, provides localization of the problem of waste removal, but still requires human intervention to maintain sanitary conditions.

It is therefore desirable that there be provided a method and/or device which is capable of autonomously detecting, treating and/or collecting of solid or semi-solid animal excrement disposed on a surface, particularly a grassy surface.

SUMMARY OF THE INVENTION

In one aspect of the present invention there is provided a method for the detection and treatment or collection of a quantity of solid or semi-solid animal excrement from a surface, particularly a grassy surface, including the steps of autonomously or semi-autonomously detecting the presence of the excrement on the surface, moving a collection/treatment device into position over the detected excrement, and, thereupon, subjecting the detected excrement to one or more of deodorization, disinfection, enhancement of deterioration, dispersal and/or collection.

The device of the present invention operates without the immediate or continued intervention of a human. Preferably, the device is robotic in nature, is readily portable, and preferably includes a rechargeable power source.

DETAILED DESCRIPTION OF INVENTION

Figure 1:
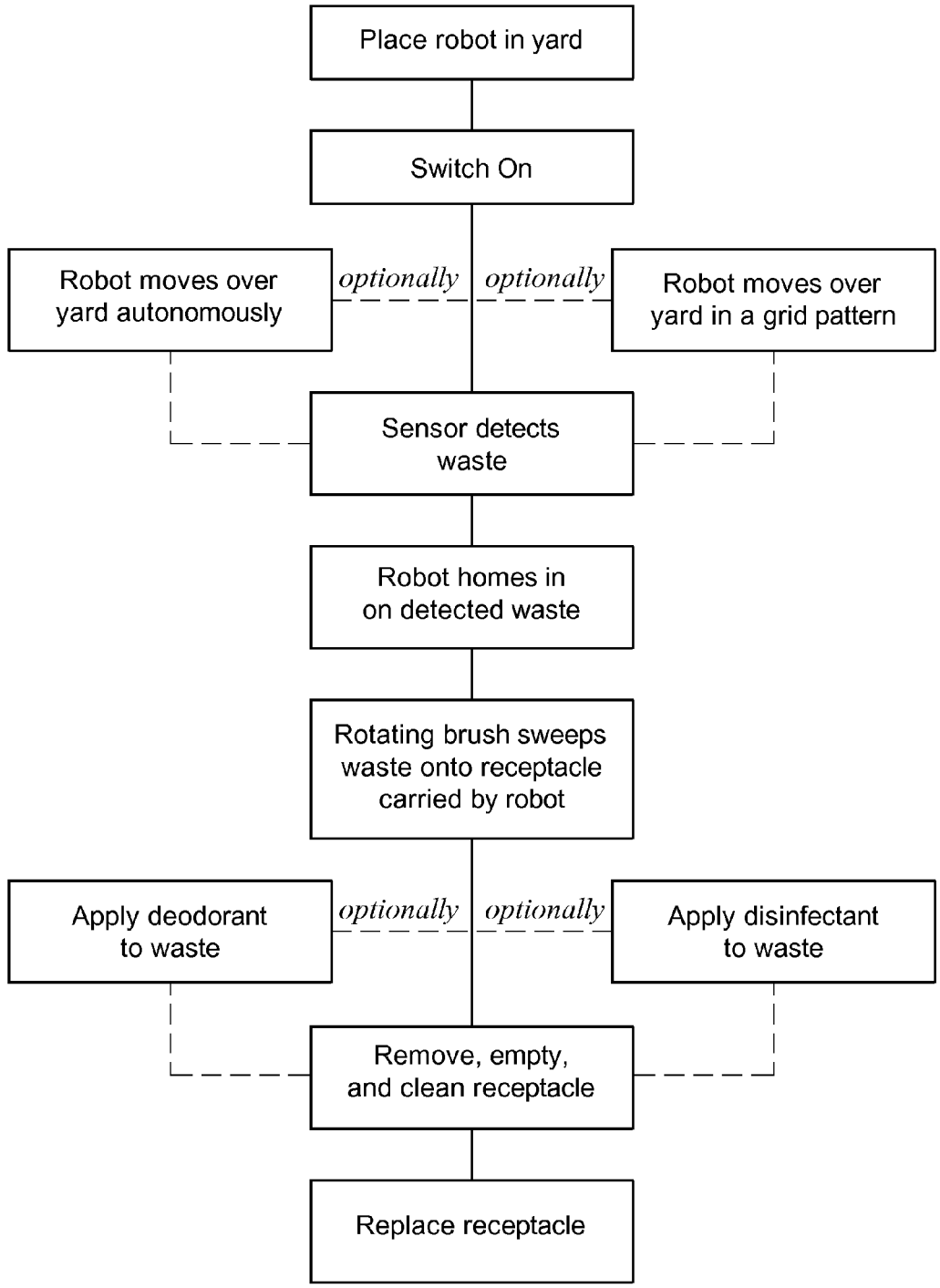
FIG. 1 is a flow diagram of one embodiment of the method of the present invention.

With reference to the several Figures, in one embodiment of the present system, an autonomous or semi-autonomously operating robotic vehicle 12 is adapted to be disposed within, and moveable over, an area which contains or potentially will contain solid or semi-solid pet waste. The area may be the floor of a pen or other structure where animals reside or over which they may move. Particularly, the area may be a grass-covered lawn. Once the apparatus is positioned within the selected area, the apparatus is switched ON as illustrated in FIG. 1. Optionally, the robotic apparatus may be programmed to maneuver over the selected area autonomously or semi-autonomously, being guided via various sensor devices adapted to detect the presence and location of a quantity of solid or semi-solid waste deposited on the surface of the selected area by a pet or other animal.

Detection of the waste deposit may be by means of odor sensors 16, 18, camera 20, infrared sensors 22, 24 or a combination of these and/or other known types of sensors.

Once a deposit is detected, a central control unit 26 for the robotic vehicle is activated to navigate the vehicle to a position adjacent to or hovering over, the detected waste deposit. Thereupon, the apparatus is further activated to perform at least one of treating the deposit to enhance its decomposition (applying an enzyme to the deposit, for example), application of a de-odorant to the waste deposit, application of a disinfectant onto the waste deposit, dispersal of the waste deposit thereby enhancing its early decomposition, or collection of the waste deposit for disposal.

Implementation of the present invention may comprise any of various forms of robotic vehicles. One embodiment of a useful robotic vehicle for the present invention, as depicted in FIGS. 2-5 includes a Navigation assembly which serves to navigate the vehicle over a selected area of the surface. This assembly includes a vehicle chassis 28 adapted to be rollably supported and navigated over a selected area by a plurality of wheels 30,32,34, and 36. The number and locations of the wheels is substantially optional so long as the wheels support the vehicle chassis substantially parallel to the surface over which the vehicle is to travel and are controllable for navigation of the vehicle.

Figure 2:
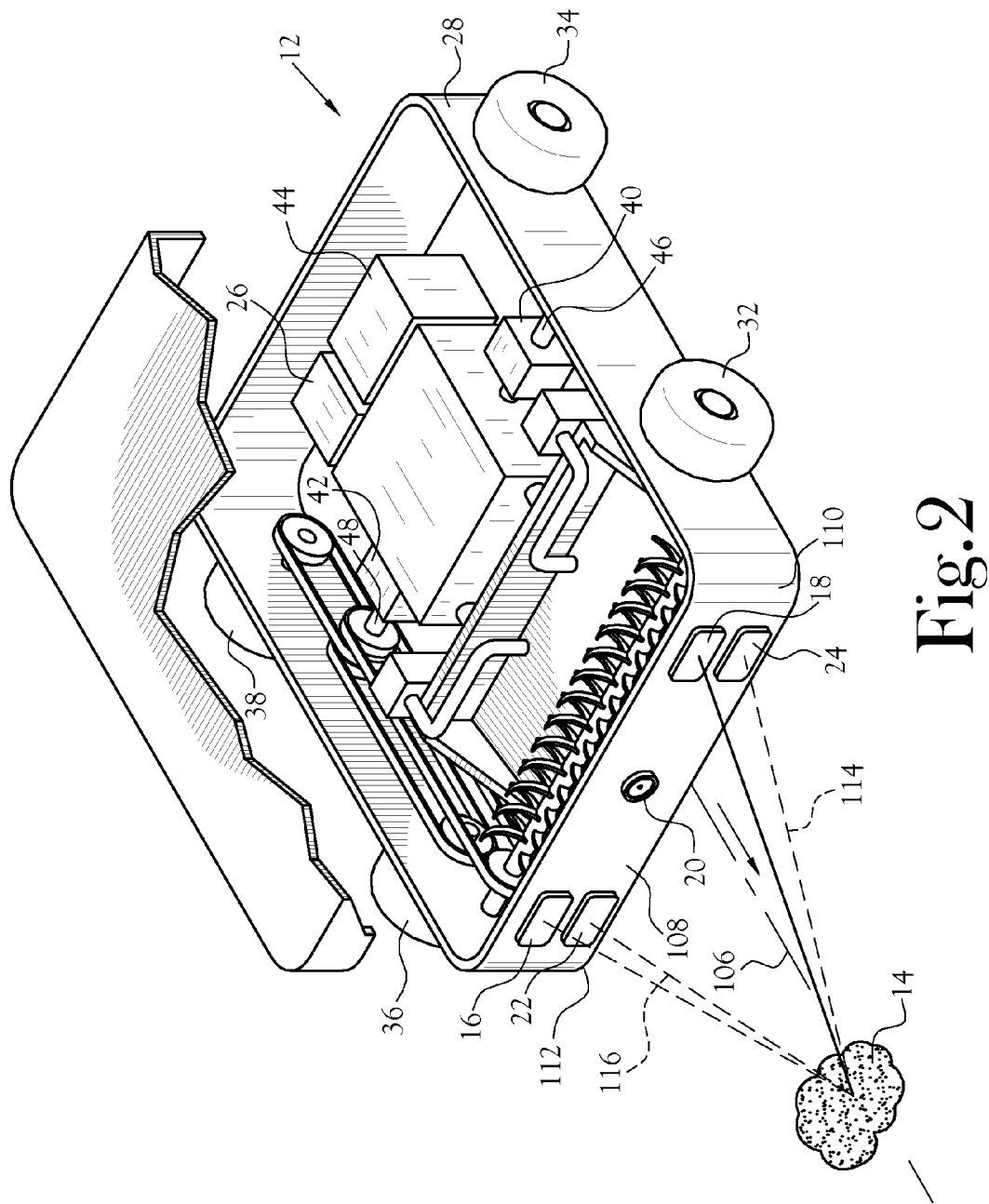
FIG. 2 is a schematic representation of one embodiment of a device for detecting and/or treatment of animal excrement disposed on a surface and embodying various of the features of the present invention.
Figure 3:
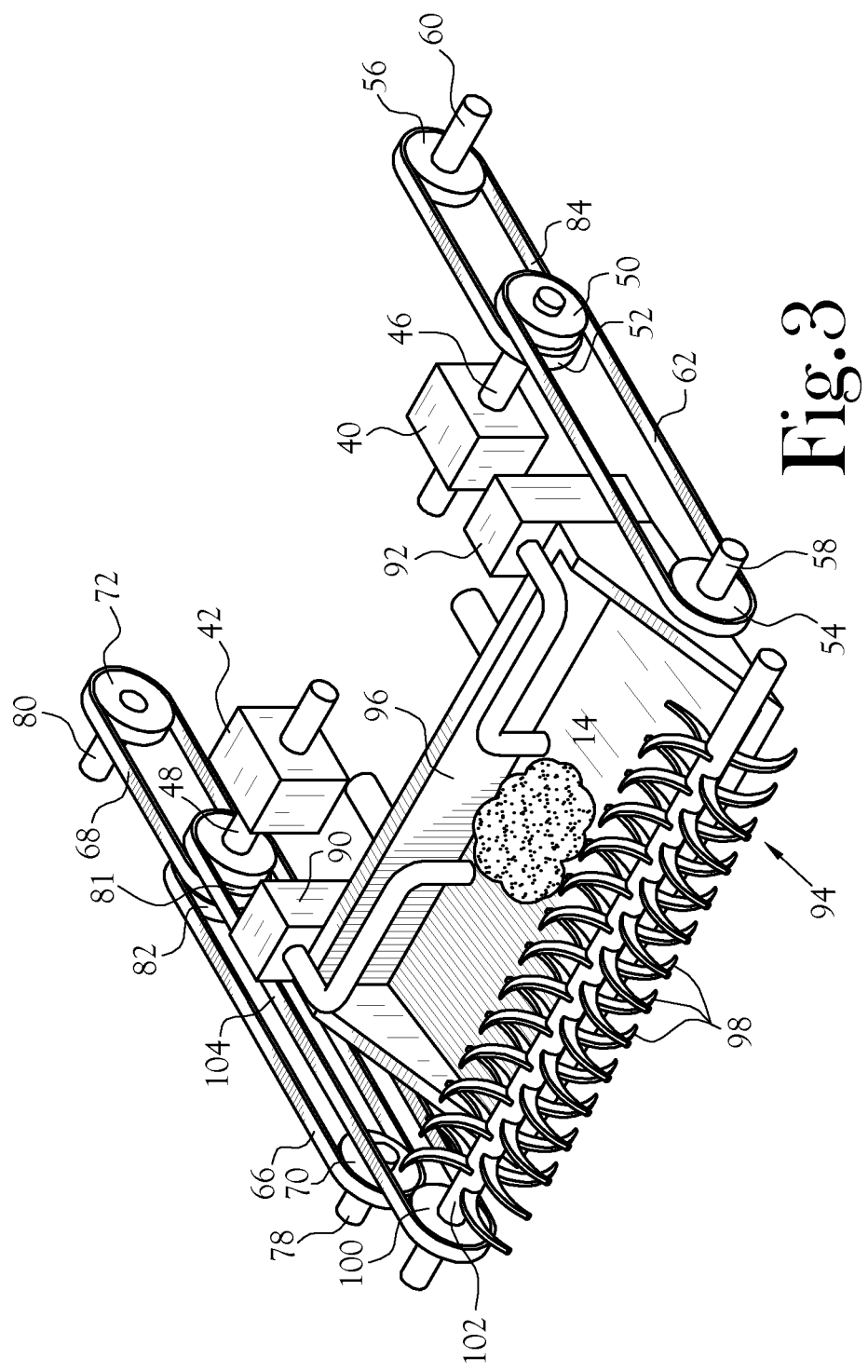
FIG. 3 is a skeletal schematic diagram of one embodiment of a navigation and control system of an apparatus of the present invention.

Referring specifically to FIGS. 2-5, power for navigation of the vehicle over the selected area may be provided by one or more electric motors 40 and 42 powered by one or more on-board rechargeable batteries 44 as shown in FIG. 3 or a conventional internal combustion engine (not depicted). In the embodiment of FIG. 2, each of the wheels is connected to a respective one of the output shafts of the electric motors 40, 42. The right hand side (as viewed in FIG. 2) of the vehicle chassis is supported by a wheel pair having first and second wheels 32 and 34. Similarly, the opposite side of the vehicle chassis is supported by a second wheel pair having wheels 36 and 38.

More specifically, the wheels 32 and 34 are connected through pulleys 50 and 52 respectively, as shown in FIGS. 2 and 3 mounted on the output shaft 46. This output shaft 46 is drivingly connected through pulleys 54 and 56 respectively. It will be noted that pulley 54 is mounted on axle 58 and that pulley 56 in mounted on axle 60 which drive wheels 32 and 34, respectively. Each drive belt overwraps the pulleys and provides for transmission of drive power to the operatively associated wheel. As needed, reversing electric clutches or like devices can be incorporated in the drive system of the depicted robotic vehicle for speed selection, rotation direction, etc. of the wheels.

In a like manner, the left hand side of the depicted vehicle chassis is driven through drive shaft 48 and its operatively associated pulleys 81 and 82 as shown in FIG. 3. Pulleys 80 and 81 are drivingly connected through drive belts 68 and 66, respectively, which overwrap the operatively associated pulleys 72 and 70 respectively mounted on the respective axles 80 and 78. It will be noted that the left hand wheel pair 38 and 36 are mounted on the axles 80 and 78, respectively. Control of the direction and speed of rotation of the left hand wheels independently of the direction and speed of rotation of the right hand wheels provides for selection of the direction of forward, rearward and/or turning of the vehicle in response to the operation of the first and second motors as controlled by the central control unit 26.

Figure 4:
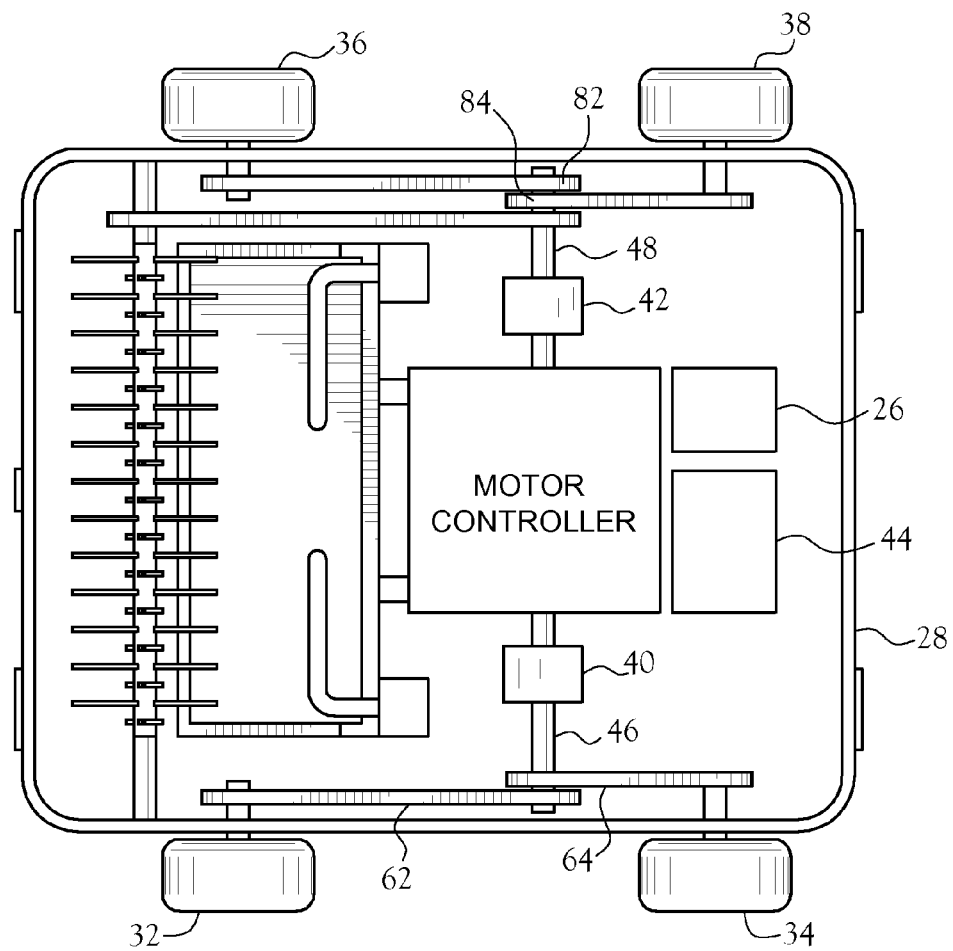
FIG. 4 is a top plan view representation of the embodiment of the present invention depicted in FIG. 2 with the chassis cover removed.
Figure 5:
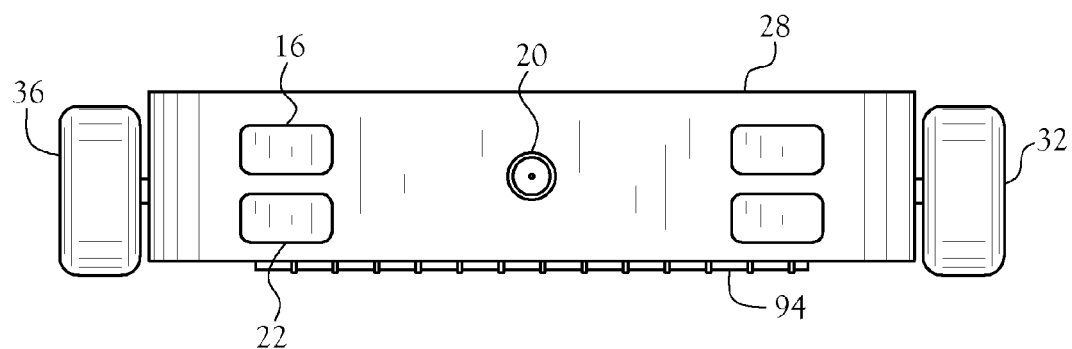
FIG. 5 is a front view of the device depicted in FIG. 2.

FIG. 4 schematically depicts one embodiment of apparatus useful in the operation of a robotic vehicle of the present invention. Specifically, in the embodiment depicted in FIG. 4, each of the wheels of the vehicle is drivingly connected to a respective electric drive which in turn is independently controllably connected to a central controller unit 26. Power for each motor is provided as by one or more rechargeable batteries. Preferably, the robotic vehicle is adapted to be stored in position to enable engaging the onboard battery to a source of electrical energy suitable for recharging of the battery when the vehicle is not in use.

Navigation of the present robotic vehicle is a function of the detection of a quantity of pet waste deposited within the selected area over which the vehicle is to travel. Specifically, employing one or more of infrared (heat detectors) sensors 22, 24, physical presence (camera 20 capable of comparing objects in the path of the vehicle to stored possible pet waste deposits), and/or odor sensors, and/or triangulation principles known in the art, signals from one or more of these sensors are input to a central controller unit 26. Within the central controller unit 26, which preferably includes a programmable computer, the signals are processed and output signals are issued to each of the drive motors for the wheels to cause the vehicle to be moved into a position adjacent to or preferably hovering over, a detected waste deposit. Thereupon, the central controller unit 26 issues one or more selected commands to effect actuation of one or more of (a) dispensing of disinfectant from a storage container 90 (see FIG. 3) carried on the chassis of the vehicle onto and/or around the waste deposit, (b) dispensing a deodorizer from a storage container 92 onto and/or around the waste deposit, (c) activation of a rotary sweeper 94 adapted to sweep the waste deposit from the area surface and into a receptacle 96 carried by the chassis of the vehicle.

In the preferred embodiment, the receptacle 96 shown in FIG. 3 is removably mounted on the chassis of the vehicle for ready withdrawal and transfer of collected waste to a proper disposal site. After cleaning of the emptied receptacle, it is returned to the vehicle for future use.

Collection of the waste deposit may take the form of employing a rotating sweeper 94 in the nature of a bristled brush or combing implement oriented to sweep the waste deposit into a receptacle 96 carried by the robotic vehicle. In one embodiment, the rotary sweeper 94 may take the form of a stiff bristled elongated brush rotatably supported on the chassis of the vehicle and having its bristles exposed to the surface over which the vehicle is to travel. As desired, rotation of this brush may be continuous or be intermittently activated through the central controller 26, such as when the vehicle is hovering over a detected waste deposit. If desired or needed by reason of the terrain over which the vehicle is to travel, metal combing teeth 98 may be substituted for the bristles of the rotating brush. In either event, the rotation of the sweeper may be effected by means of a pulley 100 mounted on the spindle 102 of the sweeper which is, in turn, drivingly connected to the output shaft of the electric motor 42 by means of a drive belt 104 or the like. Activation of the electric motor is controlled through the central controller unit, as noted.

With reference to FIG. 2, one of more sensors are mounted on the front end 108 of the vehicle, each directionally aimed forwardly of the vehicle. In FIG. 2, there are depicted first and second infrared sensors 22,24 mounted adjacent opposite side margins 110 and 112 of the front end of the vehicle chassis. These sensors are oriented such that the beams 114 and 116 from each of these infrared sensors intersect one another at a selected distance ahead of the vehicle and in alignment with the centerline 108 of travel of the chassis of the vehicle. As desired, these beams optionally may be designed to "sweep" the surface area over which the vehicle is traveling and when one beam detects a perceived waste deposit, the other of the beams "homes" in on the same perceived waste deposit to develop triangulation information which is fed to the central controller 26. Within the central controller unit 26, output signals are directed to respective ones of the driven wheels of the vehicle to adjust the direction of travel of the vehicle along a path which will cause the vehicle to move into position contiguous to and preferably hovering over, the perceived waste deposit substantially in register with the centerline 106 of the vehicle 12 and directly in line with the rotating sweeper 94. Thereby, the perceived waste deposit is positioned for treatment and/or collection by the present robotic vehicle.

Whereas infrared sensing of waste deposits may only occur with respect to "fresh" waste deposits emanating heat, the present invention contemplates the use of object detection employing a camera 20 or the like as a further or alternative mode for detecting a perceived waste deposit. In this instance, the image from the camera is directed to the central controller 26 where such image is compared to known or sample images of waste deposits and, as in order, provides an output which confirms the presence of a perceived waste deposit and/or results in the issuance of an action signal(s) from the central controller unit to one or more of the action elements of the vehicle 12, such as navigation, collection, or treatment of the perceived waste deposit.

Still further, it is within the purview of the present invention to include odor sensors 16, 18 whose detection beams function in like manner as the detection beams of the infrared sensors. Such odor sensors may be employed in combination and complementary fashion with the infrared sensors, or they may function independently of the infrared sensors to provide triangulation information to the central controller of a perceived waste deposit.

Whereas the vehicle of the present invention may move forward in a continuous fashion, treating and/or collecting waste deposits as it moves forwardly, preferably, the vehicle detects a perceived waste deposit, moves into a position generally over the perceived waste deposit and then hovers over the perceived wasted deposit for a period of time within which the perceived waste deposit is treated and/or collected as selected by the controller unit 26. Following the expiration of such hover time period, the central controller unit activates the vehicle to again commence scanning the area over which the vehicle is to travel.

Selection of the area over which the present robotic vehicle is to travel may involve random forward movement of the vehicle 12 over the selected area, with the sensors serving to scan the surface of the area and providing guidance as to the forward movement of the vehicle. In this mode of operation, the camera may be provided with stored data which, when compared to the image transmitted by the camera to the central controller unit, detects objects in the path of the vehicle 12 which clearly are not waste deposits. Thereupon the central controller unit 26 may issue a signal(s) to the drive units for the wheels to alter the direction of forward movement of the vehicle around such non-waste deposit object. Numerous suitable modes of detecting objects in the path of the forwardly moving vehicle, and the guidance of the vehicle around such objects, are known in the art. Moreover, the vehicle may be programmed to reverse and change direction if an obstacle is encountered.

Alternatively, the vehicle 12 of the present invention may be programmed to move over the selected area in a grid pattern which results in the vehicle moving over the entire selected area over a period of time of operation of the vehicle. The prior art also includes numerous suitable means for such grid pattern type movement of a robotic vehicle. In this latter instance, upon the detection of a waste deposit, the central controller 26 of the present invention activates the operation of the treatment and/or collection functions of the present invention in the manner described hereinabove. In any event, the central controller 26 may be programmed to ensure that the vehicle has covered the entire selected area over a selected time period, if desired.

Also known in the prior art are various robotic vehicles. One particular prior art robotic vehicle is that known as the ExplorBot® ERSP® robotic development platform offered by Evolution Robotics, Inc. This particular platform may serve as the basis for the addition of those elements of the present invention which provide for the navigation of the present vehicle, detection and/or treatment of detected waste deposits, and/or other functions of the vehicle of the present invention are described herein. Among other things, this platform permits travel over irregular terrain.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific detail, representative apparatus and methods, and illustrative examples shown and described. Accordingly, departures may be made from such details without departing from the spirit or scope of applicant's general inventive concept.

What is claimed:

1. Apparatus for detection, treatment or collection of a quantity of solid or semi-solid animal excrement from a surface comprising:
    a robotic vehicle including:
    a chassis,
    selectively operable navigation assembly for navigating said vehicle over a selected area of the surface,
    sensors for detecting one or more properties of a perceived quantity of animal excrement, and outputting to said central controller unit one or more signals representative of the one or more properties,
    a central controller unit having a processor for analyzing said one or more signals received therein to represent a location of the perceived quantity of animal excrement relative to said robotic vehicle, and developing one or more output signals to said navigation assembly for navigating said robotic vehicle to the location of the perceived quantity of animal excrement, and developing one or more output signals to effectuate treatment or collection of said quantity of animal excrement from said surface, and
    a removable container mounted on said chassis and adapted to receive said quantity of animal excrement therein for subsequent disposal thereof.

2. The apparatus of claim 1 and including a rotation sweeper mounted on said chassis in position to and adapted to sweep said quantity of animal excrement into said receptacle.

3. The apparatus of claim 1 and including
    a dispensing assembly for dispensing one or more of a disinfectant, a deodorizer or a dissipation enhancer onto said quantity of animal excrement.

4. Apparatus for detection, treatment or collection of a quantity of solid or semi-solid animal excrement from a surface comprising
    a robotic vehicle including:
    a chassis,
    a central controller unit mounted on said chassis,
    means for navigating said vehicle over a selected area of the surface,
    means for sensing one or more properties of a perceived quantity of animal excrement, and outputting to said central controller unit one or more signals representative of the one or more properties,
    means within said central controller unit for analyzing said one or more signals received therein to represent a location of the perceived quantity of animal excrement, and developing one or more output signals to said means for navigating said robotic vehicle to the location of the perceived quantity of animal excrement, and developing one or more output signals to effectuate the treatment or collection of said quantity of animal excrement from said surface, and
    a removable container mounted on said chassis and adapted to receive said quantity of animal excrement therein for subsequent disposal thereof.

5. The apparatus of claim 4 and including a rotation sweeper mounted on said chassis in position to and adapted to sweep said quantity of animal excrement into said receptacle.

6. The apparatus of claim 4 and including
    means for dispensing one or more of a disinfectant, a deodorizer or a dissipation enhancer onto said quantity of animal excrement.

* * * * *